United States Patent [19]

Hennig et al.

[11] 4,174,833

[45] Nov. 20, 1979

[54] SIMULATED ROAD RACING GAME

[75] Inventors: Michael Hennig, Fort Lee, N.J.; Lawrence Reiner, Woodbury, N.Y.

[73] Assignee: Mego Corp., New York, N.Y.

[21] Appl. No.: 857,517

[22] Filed: Dec. 5, 1977

[51] Int. Cl.² .................................................. A63F 9/14
[52] U.S. Cl. ..................................... 273/1 E; 35/11 R; 350/276 R
[58] Field of Search ............... 273/1 E; 272/8 M, 11; 35/11 R; 350/278, 281, 276 R; 74/45

[56] References Cited

U.S. PATENT DOCUMENTS

| | | | |
|---|---|---|---|
| 217,263 | 7/1879 | Brown | 74/45 X |
| 1,560,070 | 11/1925 | McNamara | 74/45 X |
| 2,265,598 | 12/1941 | Firestone et al. | 273/1 E |
| 2,755,212 | 7/1956 | Brown | 350/276 R X |
| 2,827,092 | 3/1958 | Fehlmann | 74/45 X |
| 3,039,349 | 6/1962 | Rodgers | 350/276 R |
| 3,078,093 | 2/1963 | Hotkins et al. | 273/1 E |
| 3,280,701 | 10/1966 | Donnelly et al. | 350/278 X |
| 3,575,413 | 4/1971 | Furukawa | 273/1 E |
| 3,635,477 | 1/1972 | Ochi | 273/1 E X |
| 3,690,657 | 9/1972 | Nakamura | 273/1 E |
| 3,707,781 | 1/1973 | Brown | 273/1 E X |
| 3,831,172 | 8/1974 | Olliges et al. | 273/1 E X |

FOREIGN PATENT DOCUMENTS

360631 4/1962 Switzerland .............................. 273/1 E

*Primary Examiner*—Paul E. Shapiro
*Attorney, Agent, or Firm*—Bertram Frank

[57] ABSTRACT

A game which simulates the sights and sounds of vehicles such as automobiles racing on one or more tracks, in which a vehicle is steered to avoid simulated crashing into the oncoming vehicles on the tracks, thus completing one or more laps of the race within a fixed time interval. The game includes an enclosure and a transparent panel which is an inclined front part of the enclosure and is both light transmissive and light reflective. Light is admitted into the enclosure from above. A plurality of movable belts having a horizontal reach are mounted within the enclosure, together with means to move the belts along their reaches. At least one toy vehicle is mounted on each belt, so that the motion of the toy vehicles as the belts move is visible through the inclined transparent panel. Another toy vehicle is disposed below the inclined transparent panel so that its image is reflected from the panel in juxtaposition with the toy vehicles on the belts. The other toy vehicle can be manipulated, so that the image of the other toy vehicle can be moved relative to the moving toy vehicles on the belts. Suitable sensors are provided to correlate the instances of visual coincidence of one of the toy vehicles on a belt with the image of the other toy vehicle. When coincidence occurs the other toy vehicle is driven so its image appears to somersault over the one toy vehicle.

42 Claims, 13 Drawing Figures

SIMULATED ROAD RACING GAME

BACKGROUND OF THE INVENTION

1. Field of the Invention

A simulated road racing game.

2. Description of the Prior Art

It is well appreciated that children derive a great deal of pleasure out of emulating their elders. One of the greatest sources of appeal has to do with automobiles and driving or riding in a car, truck or motorcycle. Thus toy vehicles of this type are well known, e.g. large toy vehicles in which the child may be seated, and by pressing pedals or levers may drive or move the vehicles. Other smaller toy vehicles which may either be battery operated or spring wound by arrangements such as described in U.S. Pat. Nos. 2,012,343; 2,182,529; 3,216,528; 3,216,529; 3,393,771; 3,541,725; 3,798,831; and 3,812,933, U.S. Pat. No. Re. 27,859 and British Pat. No. 1,192,330 also offer a great deal of pleasure to children. However, the source of greatest thrill to a child is any simulation of the actual driving of a car, e.g. in a road race such as the well-known Indianapolis 500. Here the excitement of the race and the appeal to children is enhanced by the frequent inadvertent crashes which occur, the consequences of which do not enter into the mind of the child. In addition, amusement parks often feature an attraction in which a child sits in an electrically driven car which may be steered and is speed-controllable, and in which the car moves about on an elliptical, oval or cirular track or course and bumps into the other cars likewise driven by children. Older children of driving age often engage in the so-called hot rodding in souped-up cars having oversize motors and appurtenances thereto which magnify the ability of the car to accelerate. Thus hot rod races, drag races, strip races, stock car races and the like in these super charged versions of the usual commercially sold automobiles offer a great deal of attraction to old and young alike. In summary, children of all ages are attracted by road racing and derive a great deal of enjoyment and excitement from the thrill of the race, and all its facets and aspects such as competition of laps of the race, avoidance of crashes etc. This is especially true when the child is made to feel that he or she is an actual participant in the race, e.g. a racing car driver.

SUMMARY OF THE INVENTION

Purposes of the Invention

It is an object of the present invention to provide an improved simulated road racing game.

Another object is to provide a road racing game in which the sights and sounds of an actual road race are accurately simulated.

A further object is to provide a road racing game which provides an uncanny resemblance to a real road race.

An additional object is to provide a road racing game in which the child can simulate steering of a vehicle, varying speeds of travel, the excitement of competition in laps gained, the frustration of a simulated crash between toy vehicles, the crash having appropriate sights and sounds, etc.

Still another object is to provide a road racing game which is an exciting action game having a simulation of all the thrills of a real road race.

An object is to provide a road racing game in which incidence of a simulated physical contact between vehicles, i.e. a crash, is attained by visual coincidence of one toy vehicle with the image of an other toy vehicle.

An object is to provide a simulated road racing game which is easily manipulated by a child.

An object is to provide a road racing game in which a plurality of children can compete for excellence in manipulating and playing the game.

An object is to provide a road racing game in which skill in modifying one or more variables leads to an accurate simulation of the competition of a real road race.

An object is to provide a road racing game in which the illusion of a real road race is attained and accomplished.

An object is to provide a road racing game in which the incidence of a crash or so-called wipeout in the game closely resembles, both in sight and sound, an actual crash between two vehicles at least one of which is in motion.

An object is to provide an exciting toy for the amusement of children, which toy simulates a road racing game in which the child imagines that he or she is a racing car driver.

An object is to enable a child to view simulated road racing and to participate in the simulated race by appropriate manipulation of one or more appurtenances to the game.

These and other objects and advantages of the present invention will become evident from the description which follows.

Brief Description of the Invention

In the present invention, the illusion of a simulated road racing game is accomplished by providing an image of a driven vehicle, together with sight of an actual moving toy vehicle or vehicles, for viewing by a child. What is done is to provide a reflected image of an actual toy vehicle which is capable of being manipulated, which appears to be juxtaposed adjacent to or near one or more actual toy vehicles moving on a track such as a belt or cable. When the image coincides in the view of a child with an actual moving toy vehicle, a crash or wipeout occurs, with automatic displacement of the vehicle being manipulated, together with an appropriate sound of a crash between moving vehicles. Thus, the simulation or illusion of an actual road race between and/or among vehicles is attained.

The simulation of a real road race is best attained during the crash or "wipeout" sequence, when the illusion of a crash sequence entailing the rolling over, somersaulting and catapulting out of the racing lane and above the roadway of the vehicle being manipulated is attained. This illusion is produced by the automatic displacement of the vehicle in a vertical circular path by 360°.

The illusion of a real road race involving a plurality of racing cars on parallel tracks is further enhanced, in a preferred embodiment, by having the movable tracks or belts move at different speeds, which speeds may be varied, so that a random pattern of vehicles on the tracks or belts is physically generated, with the relative spacing between vehicles always changing, so that the same relationship or relative positions between adjacent vehicles never exists from one moment to the next. In other words, for each cycle of travel of the slowest vehicle, the relative positions of the faster vehicles will differ from that in the previous cycle.

The invention in its broadest embodiment includes an enclosure, means to provide light in the enclosure, and a transparent panel which is both light transmissive and light reflective and which is an inclined front part of the enclosure. The transparent panel is generally tinted any smoky dark color, e.g. a shade of gray, green, blue or brown. This is done to prevent the formation of a double image of the elements reflected off of the panel, since if the panel was totally clear, a double image would form due to equal reflection off both the front and back of the panel. Thus the tinted transparent panel allows vision of only the more dominant image off of the front surface, and only one image is seen, without a ghost image.

At least one movable belt is provided within the enclosure, which belt has a generally horizontal reach, together with means within the enclosure to move the belt along its reach, i.e. horizontally along its longitudinal axis. At least one toy vehicle is mounted on the belt, so that the one toy vehicle is visible through the inclined transparent panel. At least one other toy vehicle is provided within and adjacent the front of the enclosure. The other toy vehicle is disposed below the inclined transparent panel, so that the image of the other toy vehicle is reflected from the inclined transparent panel in juxtaposition with the one toy vehicle as viewed by the child through the panel. Means are provided to manipulate the other toy vehicle so that the image of the other toy vehicle can be moved relative to the one toy vehicle, and generally transversely to the belt. Sensor means are provided to correlate the instances of visual coincidence of the one toy vehicle with the image of the other toy vehicle, when the movable belt is in motion and the other toy vehicle is manipulated.

Within the context of the present invention, the term substantially horizontal reach as applied to the belt will be understood to encompass and include a reach somewhat inclined from the horizontal or even a generally vertical reach, in which instances, appropriate mirrors or the like may be provided to simulate the illusion of a generally horizontal belt or plurality of belts. The belt or track, within the context of the present invention, includes any suitable means for moving the toy vehicle, such as a chain, a cable, a wire, or other functionally equivalent means to support and move the toy vehicle on the simulated track, roadway or raceway.

In a preferred embodiment, the means to provide light into the enclosure is a means to admit light into the enclosure such as a plurality of slots in the top of the enclosure, together with a source of light above the top of the enclosure. The light source may be ordinary daylight, an electric light bulb, a fluorescent lamp, etc. The slots in the top of the enclosure are preferably juxtaposed in parallel.

The transparent panel is generally inclined at an acute angle from the vertical, which angle typically is in the range of from 15° to about 70° and preferably about 35°.

In many instances a plurality of movable belts will be provided, e.g. three belts is exemplary, and means will be provided to move each of the movable belts. Each of the plurality of movable belts will have at least one toy vehicle mounted thereon and a substantially horizontal reach, with the plurality of belts being juxtaposed in parallel within the enclosure. In a preferred embodiment, an end movable belt at one side of the plurality of parallel belts moves at a predetermined speed, and the remaining belts move at successively slower speeds.

Usually means are provided to concomitantly vary the speed of all of the belts, and typically in this case, an incremental increase in the speed of any one of the movable belts is greater than the incremental increase in the speed of the next slowest belt, so as to simulate a fast lane and a slower lane for travel of the toy vehicles.

Typically the means to move each of the movable belts is a geared drive wheel on a pulley of the belt, together with an electric motor and means to pass electricity through the electric motor. The electric motor is geared to the drive wheel of at least one movable belt, so that the electric motor drives the pulley. As mentioned supra, the term movable belt includes, within the context of the present invention, other functionally equivalent means such as a chain drive, in which latter instance the sprocket of the chain drive will be driven and rotated by the electric motor. In a preferred embodiment, the pulleys of the movable belts are geared to each other seriatim, so that all of movable belts move in unison. Typically the gearing of the pulleys is step down gearing, so that an end movable belt at one side of the plurality of belts moves at a predetermined speed and the remaining belts move at successively slower speeds. Typically in this case the end movable belt is directly driven by the electric motor. In a preferred embodiment, the means to pass electricity through the electric motor is a variable means in which the electric current flow or voltage potential may be varied, so that the speed of the electric motor may be varied thereby changing or varying the speeds of the belts. The variable means to pass electricity through the electric motor typically includes a variable rheostat, which regulates the flow of current passing through the electric motor, together with means to manipulate the variable rheostat.

Typically two spaced apart toy vehicles are mounted on each belt, the two toy vehicles generally being equidistant from each other in both directions along the reach of the belt. As will appear infra, in a preferred embodiment, the reason for providing two mutually spaced toy vehicles on each belt is so that the lower toy vehicle on the belt at a suitable instance of visual coincidence of the upper toy vehicle on the belt with the image of the other toy vehicle may actuate a switch.

Various types of sensor means may be adopted. One typical sensor means is a lap counter which counts the number of laps of travel of the toy vehicle on the belt prior to visual coincidence of this toy vehicle with the image of the other toy vehicle. Preferably the lap counter will be a digital lap counter.

Another preferred type of sensor means is one in which the sensor means physically displaces the other toy vehicle, in simulation of actual contact between the one toy vehicle on the belt and the other toy vehicle, when visual coincidence of the one toy vehicle on the belt with the image of the other toy vehicle takes place. Typically the sensor means in this instance includes at least one switch, an electric motor, and displaceable means mounting the other toy vehicle in position. The switch becomes closed when visual coincidence of the one toy vehicle with the image of the other toy vehicle takes place, so that an electric circuit is completed through the electric motor, and thereupon the electric motor displaces the displaceable mounting means so that the other toy vehicle is physically displaced. The switch is preferably oriented in conjunction with means mounted to the movable belt, so that the means closes the switch when the toy vehicle on the movable belt is positioned by the belt at a visual coincidence with the image of the other toy vehicle. The means mounted to the movable belt is preferably another toy vehicle which is spaced apart from the one toy vehicle along the belt, the one toy vehicle and the another toy vehicle being equidistant from each other in both directions along the reach of the belt.

In a preferred embodiment, a first switch is oriented in conjunction with means mounted to the movable belt, so that the first switch is closable by the mounted means. A second switch is oriented in conjunction with displaceable means mounting the other toy vehicle in position. An electric motor is provided. The first and second switches are closed when visual coincidence of the one toy vehicle on the belt with the image of the other toy vehicle takes place, so that when the first and second switches are closed, an electric circuit is completed through the electric motor and the electric motor is actuated and displaces the displaceable mounting means, so that the other toy vehicle is physically displaced. This embodiment is preferably combined with a third switch, in which case the displaceable mounting means is rotatable and includes a disc-shaped member geared to the electric motor and having a radial tab. The radial tab cams the third switch to an open position after a time interval during which the displaceable mounting means has rotated by 360°, so that the electric motor circuit is broken and so that the other toy vehicle after circular displacement by 360° returns to its original position and orientation. During this time interval, the one toy vehicle on the movable belt is moved by the belt to a position in which the one toy vehicle is not visually coincident with the image of the other toy vehicle, and play of the game resumes.

The third switch when intermittently closed also completes circuits to means for visual and aural sensing that a crash or "wipeout" has occurred, due to the visual coincidence of the one toy vehicle on the moving belt with the image of the other toy vehicle. Thus, closing of the third switch preferably also completes an electrical circuit to an electric light within the enclosure, so that the electric light becomes lit during the time interval. Thus the electric light is intermittently lit only during the time interval, and the electric light when lit illuminates a recognizable identity symbol within the enclosure, which symbol corresponds to the simulated crash taking place because of the visual coincidence of the one toy vehicle on the moving belt with the image of the other toy vehicle. Thus the image of the recognizable identity symbol is visible through, or by reflection from, the inclined transparent panel. The symbol typically is a sign having a word thereon, which word, such as "wipeout" corresponds to the simulation of actual physical contact between the one toy vehicle and the other toy vehicle. The third switch when intermittently closed also preferably completes an electrical circuit to means to emit an audible sound, e.g. a loudspeaker and sound track on a toy phonograph. The emitted sound simulates the sound of actual physical contact between vehicles, i.e. a crash. The third switch when intermittently closed during the finite time interval mentioned supra, which is usually on the order of 3 to 10 seconds, may also interrupt a circuit to a digital lap counter, so that the digital lap counter ceases counting the completion of a lap of travel of the one toy vehicle on the moving belt. Thus the digital lap counter counts the number of laps of travel of the one toy vehicle on the belt prior to visual coincidence of the one toy vehicle with the image of the other toy vehicle.

The means to manipulate the other toy vehicle is generally means to displace the other toy vehicle transversely relative to the movable belt. Thus, in a preferred embodiment, the means to manipulate the other toy vehicle includes a rotatable wheel simulating the steering wheel of a vehicle. The rotatable wheel is coaxially mounted on a shaft and is capable of being manipulated so that the shaft is rotatable about its central longitudinal axis. A drive disc having a projecting annular first tab is coaxially mounted on the shaft. The first tab is generally perpendicular to the surface of the drive disc. A drive arm pivoted at one (upper) end is provided. The drive arm has a slot and the first tab extends transversely into the slot. The other end of the drive arm is bifurcated and encloses a second tab, which second tab is attached to slidable means mounting the other toy vehicle below the inclined transparent panel, so that manipulation of the rotatable wheel, as in steering a vehicle, causes the means mounting the other toy vehicle to slide transversely relative to the movable belt.

In a preferred embodiment, and to effectively simulate the atmosphere of a road race, means to emit an audible sound, such as the simulated sound of vehicles in motion, is provided in the game. The audible sound is emitted when the movable belt is in motion.

The transparent panel may be composed of glass or of a sheet of clear plastic. Typical plastics feasible for usage as the material of construction for the transparent panel include, inter alia, cellulose acetate, polyvinyl chloride, polyethylene, polypropylene, acrylic resin, urea-formaldehyde resin, and nylon.

The toy vehicles are preferably toy automobiles, which may resemble known racing cars such as stock cars, high speed racing cars, or conventional automobiles. It will be appreciated however that one or more of the toy vehicles may simulate and resemble a truck, a bus, a motorcycle, a tractor, etc. in suitable instances.

The present invention provides several salient advantages. The child is effectively transported into the world of road racing with all its thrills and excitement, since the child sees the sights and hears the sounds of a road race, and due to manipulation of appurtenances to the game, the child readily imagines that he or she is an actual real racing car driver in a real race of any one of the types mentioned supra. Thus, an improved simulated road racing game has been provided, which is attractive to children of all ages. The sights and sounds of an actual road race are accurately simulated, and the game provides an uncanny resemblance to a real road race or speedway race. The child simulates steering of a vehicle, varying speeds of travel, the excitement of competition in laps gained, and the frustration of a simulated crash or wipeout between toy vehicles, the crash having appropriate sights and sounds. The game is an exciting action game with motion and a simulation of all the thrills of a real road race. The game is easily manipulated by a child, and a plurality of children can compete for excellence in manipulating and playing the game. Thus, developed skill in modifying one or more variables leads to an accurate simulation of the competition of a real road race, and the illusion of a real road race is attained and accomplished. The incidence of a crash or so-called "wipeout" in the game closely resembles, both in sight and sound, an actual crash between two vehicles at least one of which is in motion. Thus an exciting toy for the amusement of children is provided, and the child readily imagines that he or she is an actual racing car driver. The game enables a child to view a simulated road race and to participate in the simulated race by appropriate manipulation of one or more appurtenances to the game.

The invention accordingly consists in the features of construction, combination of elements, and arrangement of parts which will be exemplified in the article of manufacture herein after described and of which the scope of application will be indicated in the appended claims.

BRIEF DESCRIPTION OF THE DRAWINGS

In the accompanying drawings in which is shown one of the various possible embodiments of the invention.

DETAILED DESCRIPTION OF THE PREFERRED EMBODIMENTS

Figure 1:
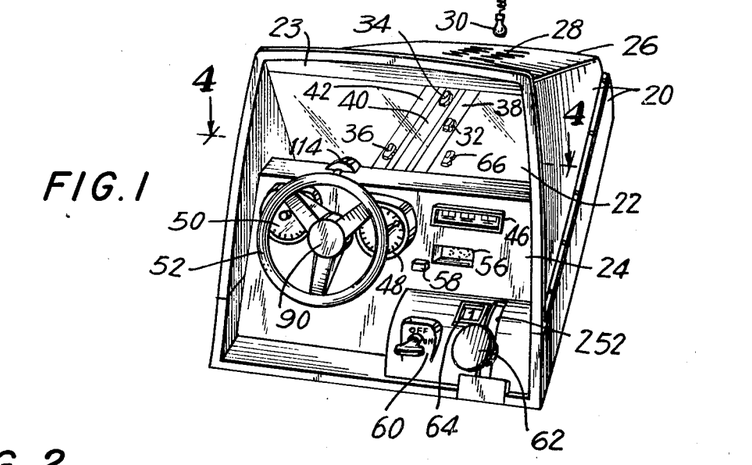
FIG. 1 is an overall perspective view of the game.
Figure 2:
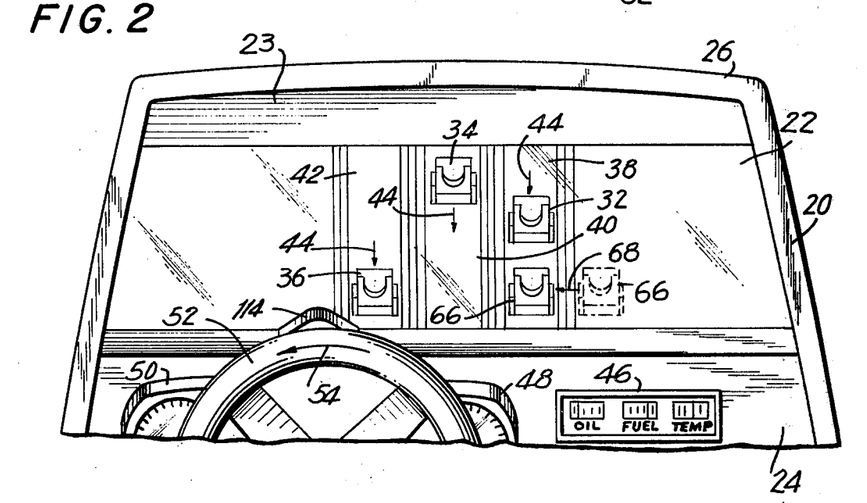
FIG. 2 is an elevation view of the transparent panel with toy vehicles visible during normal play of the game.
Figure 3:
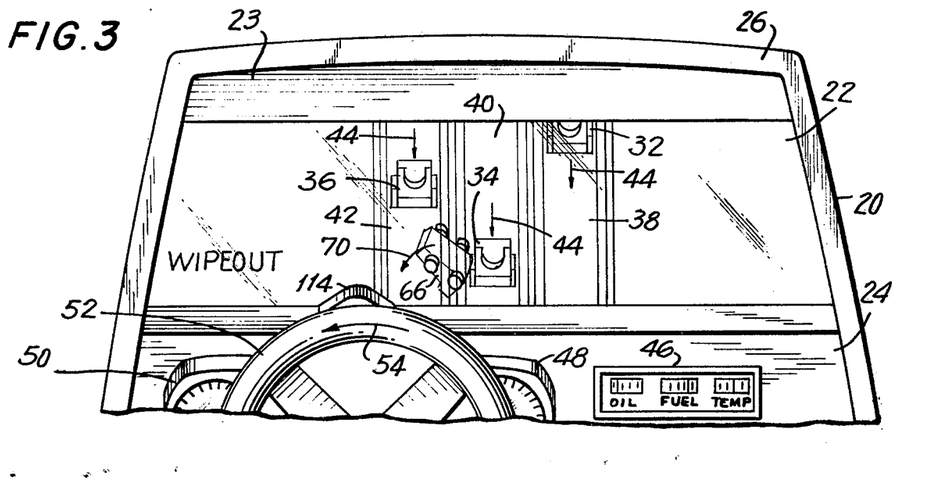
FIG. 3 shows a simulated crash or wipeout as viewed through the transparent panel.
Figures 5, 6:
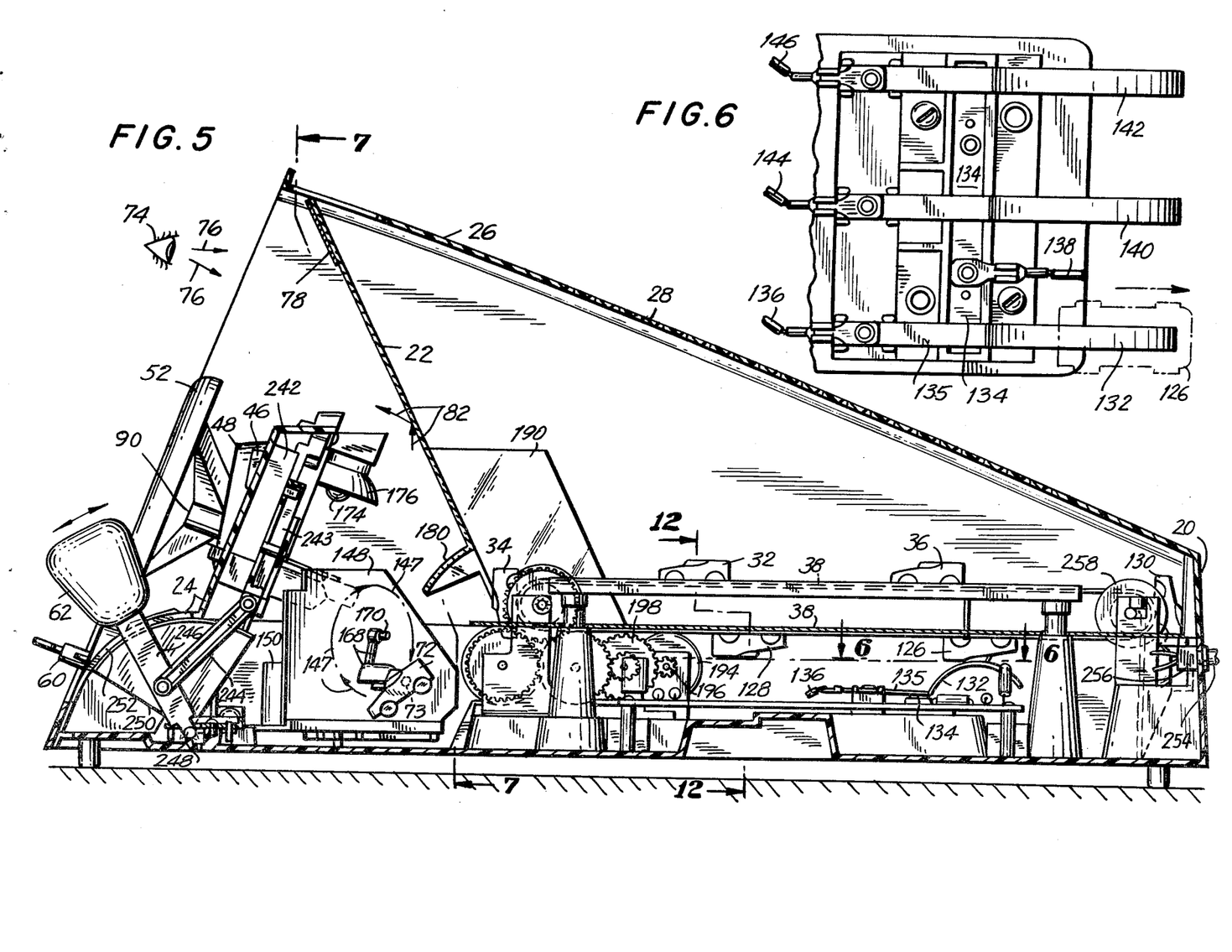
FIG. 5 is a sectional elevation view taken substantially along the line 5—5 of FIG. 4.
FIG. 6 is a sectional plan view taken substantially along the line 6—6 of FIG. 5.

Referring now to FIGS. 1, 2 and 3, an enclosure 20 is provided with an inclined transparent front panel 22 which is both light-transmissive and light-reflective. As best seen in FIGS. 1 and 5, the front panel 22 is inclined typically at an angle of about 35° from the vertical, and the lower part of the panel 22 is rearwards in the enclosure 20 so that visible elements disposed behind a simulated front dashboard 24 are reflected by the panel 22 out of the enclosure 20. It will be appreciated that only selected elements are visible through the panel 22; most of the interior surfaces and appurtenances within the enclosure 20 will be coated or colored black or another dark color in practice so that they are not visible to a child playing with the game. However for purposes of elucidating the invention many of these elements have been shown in the FIGURES as if they were visible, or as they would appear if the enclosure 20 was opened and exposed to ambient light. In addition, typically the upper portion 23 of panel 22 is darkened or coated with a layer of light-absorptive material so as to mask the entry of light into the enclosure.

The upper surface 26 of the enclosure 20 is provided with a plurality of parallel slots 28 so that light emanating from an upper source such as light bulb 30 passes downwards into the enclosure and selectively illuminates toy vehicles 32, 34 and 36, each of which is mounted on a respective belt 38, 40 and 42, with the upper reaches of the belts 38, 40 and 42 moving towards the front of the enclosure so that the toy vehicles 32, 34 and 36 are seen as moving forwards, as indicated by arrows 44.

The front dashboard 24 simulates the dashboard of a real racing car. Thus simulated gauges 46, 48 and 50 having no function as far as playing the game is concerned, or as far as the invention is concerned, are provided on the dashboard 24. The dashboard 24 does however include certain elements which are an integral part of the game, namely steering wheel 52, which is shown as indicated by arrow 54 as being rotated in a counterclockwise direction, digital lap counter 56 (FIG. 1), reset button 58, off-on switch 60 which controls electrical power to the game and simulates the ignition switch of a vehicle, and simulated gear shift knob or lever 62 which controls a variable rheostat, as will appear infra, and which is manipulated in conjunction with speed indicator 64 which indicates the speed setting during playing of the game, which speed or gear setting corresponds to the speed of travel of the belts 38, 40 and 42. As shown, the shift knob 62 has been manipulated so that the speed corresponds to the slowest forward speed, i.e. first gear, and the numeral 1 appears on indicator 64.

FIGS. 1, 2 and 3 also show the visible aspects of the sequence when a simulated crash or "wipeout" occurs. Thus, the image 66 of an other toy vehicle which is disposed immediately behind dashboard 24 and below the panel 22 is shown. The image 66 is reflected out of the enclosure 20 by the panel 22 and is thus juxtaposed with the visual sight of the moving toy vehicles 32, 34 and 36 as seen through the panel 22. The crash or wipeout sequence is attained by rotating steering wheel 52 as shown by arrow 54, so as to laterally displace the actual other toy vehicle behind the dashboard essentially transversely to the belts 38, 40 and 42. This makes the image 66 of the other car appear to move into the lanes of travel of the toy vehicles 32, 34 and 36. At the onset (FIG. 2) the phantom outline of image 66 shows the initial position which has been displaced as indicated by arrow 68 into the lane of travel of belt 38 and toy vehicle 32, which is the slowest moving of the three lanes of travel. Continued rotation of steering wheel 52 has placed the image 66, in FIG. 3, into visual coincidence with toy vehicle 34 so that a simulated crash or "wipeout" has occurred. The actual other toy vehicle behind the dashboard, and thus the image 66, are now displaced as indicated by arrow 70, to correspond to an actual crash between the toy vehicles in which the other toy vehicle being steered by the child has been flipped over. In addition, sights and sounds of a crash are provided, as will appear infra. The word "wipeout" is now visible on the panel 22, being reflected from below the dashboard, as will appear infra.

Figure 4:
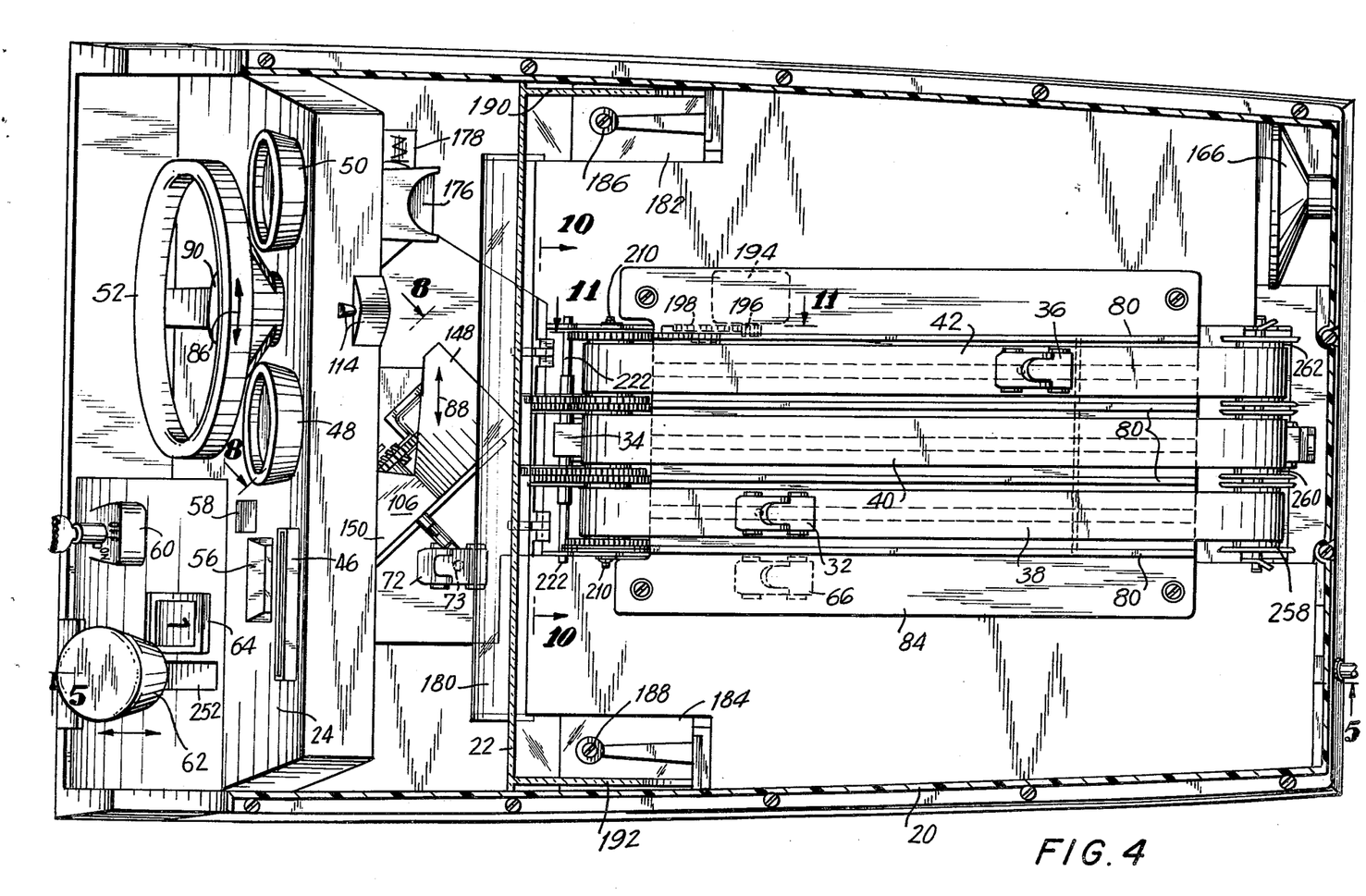
FIG. 4 is a sectional plan view taken substantially along the line 4—4 of FIG. 1.

Referring now to FIGS. 4 and 5, internal structural elements of the game are shown. The actual other toy vehicle 72 is shown. This displaceable toy vehicle 72 may be wholly illuminated by an internal or external electric light bulb 73, and vehicle 72 is laterally displaceable transverse to the belts 38, 40 and 42, when the steering wheel 52 is manipulated, i.e. rotated, and is also displaceable by 360° about a circular path when a simulated crash or "wipeout" occurs due to visual coincidence of one of the moving toy vehicles 32, 34 and 36, on their respective moving belts 38, 40 and 42, with the image 66 of the toy vehicle 72 disposed below the panel 22.

FIG. 5 shows how the eye 74 of a child peering in the direction indicated by arrows 76 looks through the transparent panel 22 below an upper black horizontal masking strip 78 and sees the toy vehicles 32 and 36 on their respective belts or tracks. The black masking strip 78 is provided so that the child cannot see the light emanating downwards through slots 28. Ordinarily the belts 38, 40 and 42 will also be black so that they are not visible to the child, however white stripes 80 (FIG. 4) delineate the lateral margins of the simulated tracks on which the toy vehicles 32, 34 and 36 move. The light emanating downwards from slots 28 also illuminates the other toy vehicle 72, so that the image 66 of the other toy vehicle is reflected off of panel 22 as indicated by arrows 82 and appears to also be on a track juxtaposed with the toy vehicles 32 and 36 (FIG. 4). The position of the image 66 in FIG. 4 corresponds to that in FIG. 2. Here the image 66 appears to be in the extreme right lane 84 which is a safety lane. If the steering wheel 52 is not manipulated so as to move the image 66 into one of the tracks or lanes corresponding to belts 38, 40 or 42 by lateral motion of the actual other toy vehicle 72 transversely to the belts 38, 40 or 42, then the image 66 remains in the lane 84, and no laps are recorded by lap counter 56 and the player cannot get to the finish and win. It will also be appreciated that a crash or wipeout cannot occur because visual coincidence of image 66 with any of the toy vehicles 32, 34 or 36, and concomitant closing of an electrical circuit, cannot occur.

Figure 7:
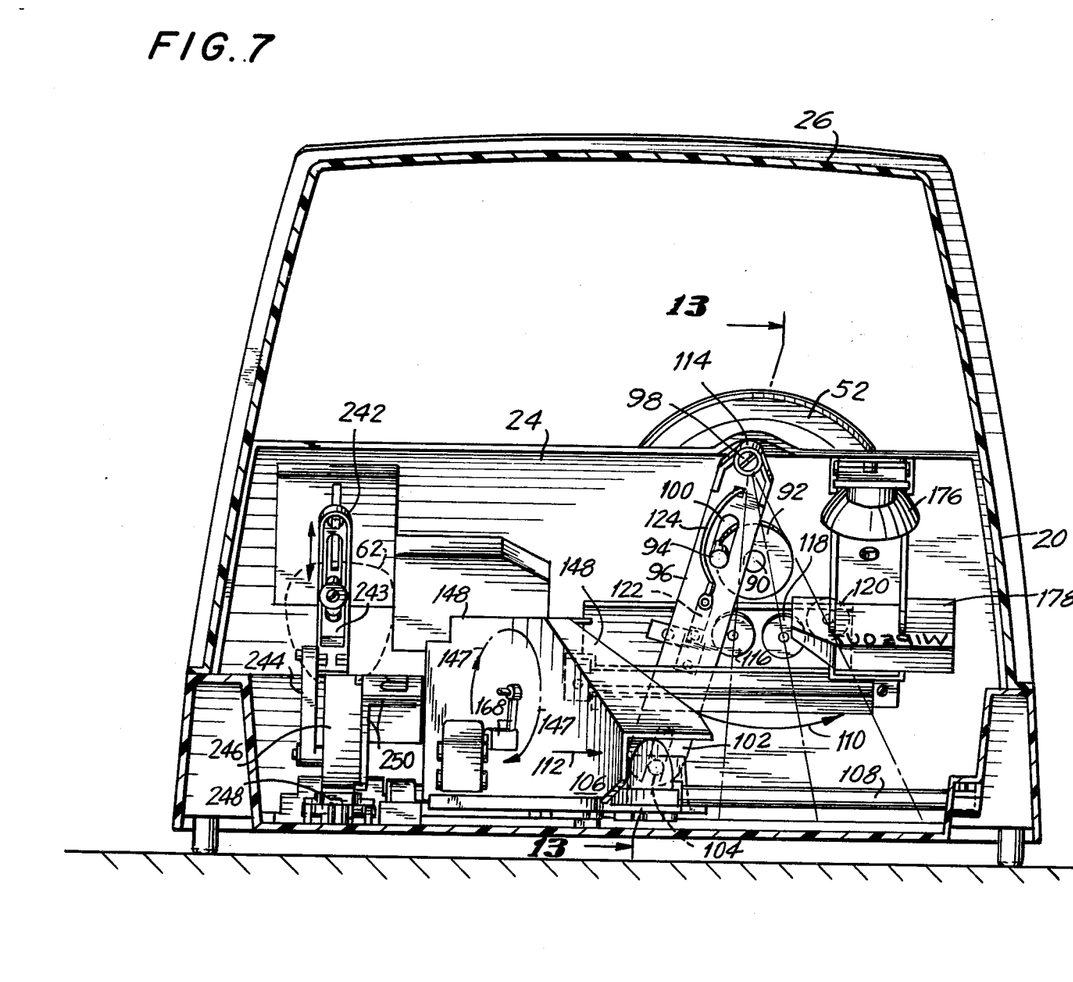
FIG. 7 is a sectional elevation view taken substantially along the line 7—7 of FIG. 5.

The mode of manipulation by rotation of the steering wheel 52, either clockwise to bring the image 66 towards safety lane 84 or counterclockwise to bring the image 66 into one of the tracks or lanes corresponding to belts 38, 40 and 42, is indicated by the two-headed arrow 86 (FIG. 4). The corresponding lateral displacement of the toy vehicle 72 and its mounting is indicated by two-headed arrow 88. The mechanism for this lateral displacement of the actual other toy vehicle 72 and concomitant displacement of its image 66 is best shown in FIG. 7. The mechanism and means to transversely manipulate the other toy vehicle 72 includes the rotatable steering wheel 52, which is coaxially mounted on a shaft 90 so that when wheel 52 is rotated, the shaft 90 is rotatable about its central longitudinal axis. The shaft 90 extends through the dashboard from the wheel 52 to a drive disc 92 coaxially mounted to the shaft 90. The drive disc 92 has a projecting annular tab 94 which extends generally perpendicular to the surface of the drive disc 92. A drive arm 96 is provided. The drive arm 96 is pivoted at its upper end 98 and has a middle longitudinal slot 100 into which the tab 94 extends transversely. The lower other end 102 of the drive arm 96 is bifurcated and encloses a tab 104 which is attached to the mounting structure for the toy vehicle 72, generally designated as 106. The structure 106 is slidably mounted on bar or rod 108 which is oriented below the dashboard transversely to the belts 38, 40 and 42, so that manipulation of the rotatable wheel 52 causes drive disc 92 to rotate, and tab 94 cams drive arm 96 so that this arm pivots about the upper pivot mounting 98 as shown by arrow 110; and the lower end 102 of drive arm 96 cams tab 104 to move the entire structure 106 slidably along on bar 108 and to the right as shown by arrow 112. The result is transverse motion of the toy vehicle 72 and associate mounting structure 106. The upper mounting of the pivot 98 in the dashboard is generally designated as 114.

The transverse motion of structure 106 and toy vehicle 72 corresponds to entry of the image 66 into one of the tracks or lanes of travel of the moving toy vehicles 32, 34 or 36 on their respective belts. In order to correlate this entry of image 66 into one of the lanes with sensor means, and thereby to correlate the instances of visual coincidence of a toy vehicle 32, 34 or 36 with the image 66, button contact switch elements 116, 118 and 120 are provided in the back of the dashboard, in conjunction with a contact element 122 mounted to the drive arm 96. Contact between element 122 and any one of the buttons 116, 118 or 120 sends a corresponding signal via wire 124 to the sensor means, which may be the digital lap counter 56, in which case elapsed laps without a crash or wipeout are recorded electronically, and/or which may be, as will appear infra, to complete a circuit to sensor means to initiate the crash or wipeout sequence as sensed by a completed electrical circuit, as will appear infra.

Referring now to FIGS. 5 and 6, aspects of the switching of the electrical circuit which when completed initiates the crash or wipeout sequence are shown. In this preferred embodiment of the invention, the sequence for measuring the position of a given toy vehicle on a belt in visual coincidence with the image 66 entails the provision in practice of two toy vehicles on each belt, with another toy vehicle besides the one showing on the top of each belt being mounted to the belt and spaced apart from the one upper toy vehicle, the two toy vehicles on each belt, namely the one toy vehicle on top and the another toy vehicle on the bottom (at a given moment during travel of the belt) being equidistant from each other in both directions along the reach of the belt. Thus, another toy vehicle 126 is shown (FIG. 5) mounted to the bottom reach of belt 38. Toy vehicle 126 is equidistant from toy vehicle 32 in both directions along the reach of the belt 38. Another toy vehicle 128 is mounted to belt 42 and is equidistant in both directions along the reach of the belt 42 from toy vehicle 36. Another toy vehicle 130 is mounted to belt 40 and is equidistant in both directions along the reach of the belt 40 from toy vehicle 34. As shown in FIG. 5, this is clearly evident since toy vehicle 34 is at one end of the belts and rounding a drive pulley while toy vehicle 130 is at the other end of the belts and is also rounding a drive pulley.

FIG. 5 shows the another toy vehicle 126 camming an arcuate spring 132 which is thus moved downwards in the direction indicated by arrow 133 (FIG. 12), so that spring 132, the flat generally horizontal base 135 of which conducts electricity, is now contacting a bus bar 134, so as to close and complete an electrical circuit via wire 136 to the sensor means actuating the crash or wipeout sequence. The other end of the electrical circuit is via wire 138 from bus bar 134 to the power source. The crash or wipeout sequence is typically initiated in this instance when spring 132 is cammed downwards to complete an electrical circuit thus sensing a specific location for toy vehicle 32, and concomitantly the image 66 is in the track corresponding to belt 38 which occurs when an electrical circuit through button contact switch element 116 is completed. The dimensioning is such that when these two electrical circuits are completed, image 66 is in visual coincidence with the one toy vehicle 32, as seen by the eye 74, and the crash or wipeout sequence is electrically initiated due to the completion of an electrical circuit concomitantly through both switching elements and means. Similar arcuate springs 140 and 142 (FIG. 6) are provided beneath the other two belts, with the springs 140 or 142, when one is cammed by a toy vehicle, contacting bus bar 134 and completing an electrical circuit between power source wire 138 and, respectively, wires 144 or 146 which, respectively, connect with button contact switch elements 118 or 120 to also initiate the crash or wipeout sequence, if the image 66 is in visual coincidence, respectively, with toy vehicle 34 or 36. In other words, the lateral manipulation of the other toy vehicle 72 moves the image 66 transversely across the tracks or lanes defined by belts 38, 40 and 42, and the objective of the game is to so manipulate the other toy vehicle 72 that image 66 does not coincide with a toy vehicle, and thus to prevent a crash or wipeout and thus to gain more laps of elapsed travel of the toy vehicles on the belts without a crash or wipeout.

To summarize the operation of the game, at the onset the steering wheel 52 is turned clockwise so that image 66 is in the extreme right lane. Electrical power is furnished. The ignition key 60 is turned clockwise to the on position. The reset button 58 is pushed. Now the game is operative and ready for competition. The shift knob 62 is used to shift to any desired speed, typically three speeds forward, which successively increases the speed of the belts, i.e. first speed-slow, second speed-moderate, and third speed-fast. Also the shift knob 62 typically may be placed in a neutral position in which no motion takes place, and a reverse position in which the belts and their toy vehicles move in a reverse direction. To move the image 66 into a selected lane, the steering wheel 52 is turned. There are four lanes. The extreme right lane 84, as mentioned supra, is a safety lane. The player cannot get to the finish and win, if the image 66 is kept in this lane, because no laps are recorded. As will appear infra, structure and means are preferably provided so that belt 38 (the slowest lane) moves at a predetermined speed, belt 40 (faster lane) moves a greater speed, and belt 42 (fastest lane) moves at a still greater speed. It is evident that the chance of a crash or wipeout is greatest when the image 66 is in the track or lane defined by belt 42, however here the greatest number of laps are gained during the time interval the game is in progress. As will appear infra, if a crash or wipeout occurs, the action does not stop, but instead the player keeps driving until a pre-determined time interval has elapsed. After this time interval, the number of completed laps recorded on the digital lap counter 56 is noted, and the next player plays the game as described supra, starting by pushing the reset button. Crashing can be avoided by reflex turns of the steering wheel, and the game thus accurately simulates a real road race.

Figure 8:
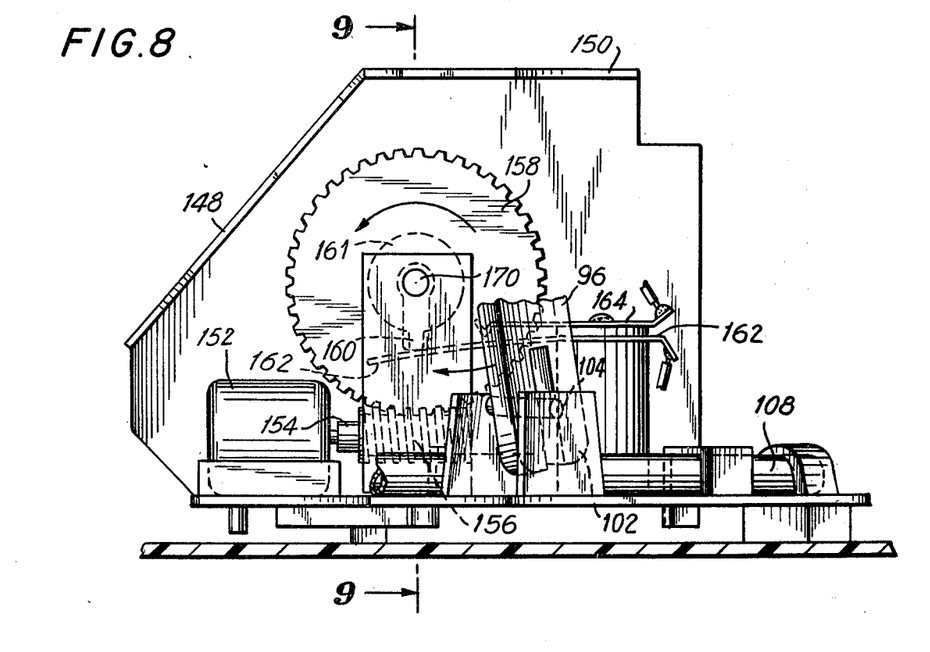
FIG. 8 is a sectional elevation view taken substantially along the line 8—8 of FIG. 4.
Figure 9:
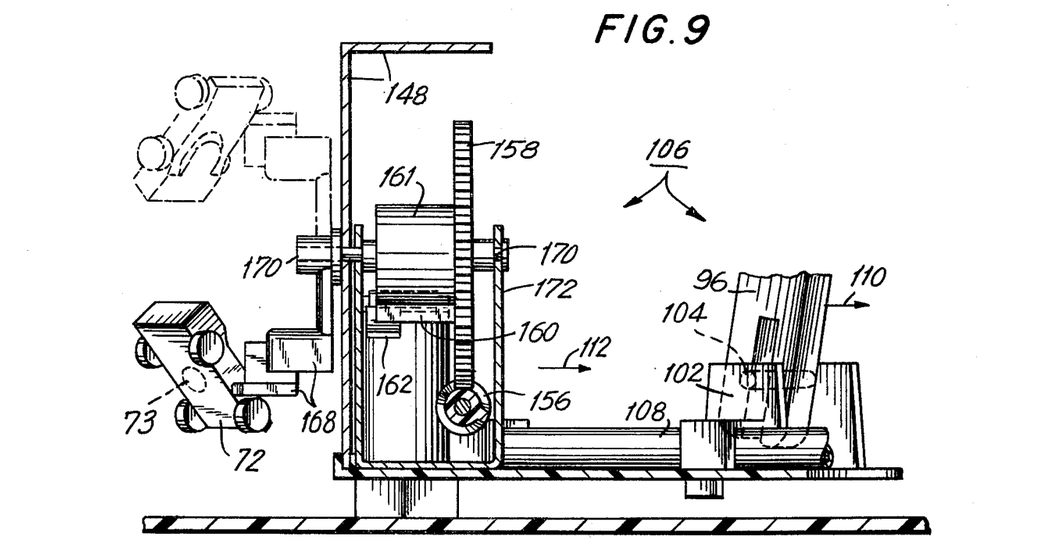
FIG. 9 is a sectional elevation view taken substantially along the line 9—9 of FIG. 8.

The crash or wipeout sequence will now be described in detail. At the onset, the mechanism by which the actual other toy vehicle 72 is rotated about a circular path (FIGS. 5 and 7, arrows 147) during a crash or wipeout is hidden from view by a child via the provision of black colored panels or shielding 148 and 150 (FIG. 4). Referring now to FIGS. 8 and 9, an electric motor 152 is connected via keyed coupling 154 to worm gear 156 which drives the geared rotatable disc-shaped member 158 which has a radial tab 160 mounted on an associated and coaxial cylindrical support drum 161. As a part of the crash or wipeout sequence, the motor 152 is energized by the completion of the electrical circuits during a crash, i.e. during visual coincidence of image 66 with any one of the toy vehicles 32, 34 or 36. At this time the tab 160 is moved away in a circular path from a lower leaf arm 162 of a switch defined by arm 162 and upper arm 164. Thus an electrical circuit between arms 162 and 164 is completed, and two results are thereby attained. Motor 152 remains energized and a toy phonograph or the like, not shown, sends the sound of vehicles crashing to phonograph loudspeaker 166 (FIG. 4) from whence this sound emanates as long as the switch defined by arms 162 and 164 remains closed. After a time interval, during which the member 158 has rotated by 360°, the radial tab 160 cams the lower switch arm 162 so as to open the switch and break the electrical circuit, and the sound of vehicles crashing ceases to emanate from loudspeaker 166. During this finite time interval of typically 2 to 10 seconds, the one toy vehicle 32, 34 or 36 has been moved by its movable belt to a position in which the one toy vehicle is no longer visually coincident with the image 66, and the road race continues, with motor 152 being deenergized until the next time the crash or wipeout sequence is initiated.

Besides permitting the switch defined by arms 162 and 164 to close for the finite time interval, the 360° rotation of member 158 during the crash or wipeout sequence also causes the actual other toy vehicle 72 to move about in space about a circular path and by 360°, so that the image 66 appears to flip over and then to regain its original position. Thus, as best shown in FIG. 9, the actual other toy vehicle 72 is mounted by support members 168 to the central axle 170 of member 158, so that the actual vehicle 72 is freely rotatable in space, as shown by the phantom outline (FIG. 9), upon rotation of member 158. Axle 170 is supported by U-shaped bracket 172. The members 168 and 148 are colored or coated black so that they are not visible to the eye 74, and also so that members 152, 154, 156, 158, 170 and 172 are also not visible. Thus the eye 74 merely sees the image 66 of toy vehicle 72, which toy vehicle 72 is typically colored a bright orange or other suitable color, so that light coming through slots 28 illuminates toy vehicle 72 as well as the toy vehicles on the moving belts, which toy vehicles are also brightly colored, e.g. red, yellow or blue. Thus the eye 74 peering through panel 22 merely sees toy vehicles 32, 34 and 36 moving along in tracks defined by white stripes 80, as well as image 66.

Intermittent completion of the electrical circuit through arms 162 and 164 also temporarily energizes and lights up electric light bulb 174 (FIG. 5) which shines downwards only due to the provision of screen 176 which is black. The bulb 174 thus intermittently illuminates, only during the crash or wipeout sequence, a lower sign 178 (FIGS. 5 and 7) bearing the word "WIPEOUT" so that this word appears and is reflected from the panel 22 in a manner similar to image 66 as described supra. Thus as shown in FIG. 3 the word wipeout appears concomitantly with the flipping over of image 66.

FIGS. 4 and 5 also show a lower curved cowling 180 at the bottom of the panel 22. The cowling 180 is translucent, so that light may penetrate and further illuminate various visible elements such as the actual other toy vehicle 72, but so that the progression of the toy vehicles 32, 34 or 36 downwards or upwards at the ends of the belts 38, 40 or 42 closest to the panel 22 is not visible. The panel 22 is also provided with two lateral bifurcated mounting extensions 182 and 184 (FIG. 4), so that the panel 22 is mounted in place by screwing screws 182 and 188 downwards against their respective washers as shown. Connecting panels 190 and 192 are provided for structural integrity and rigidity, and to lend strength to the extensions 182 and 184.

Figure 10:
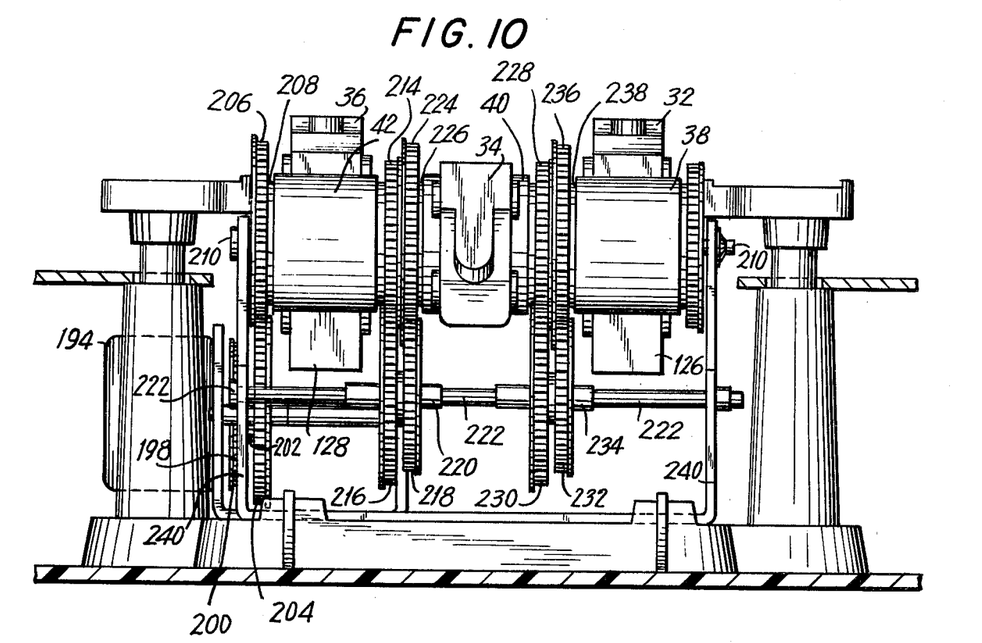
FIG. 10 is a sectional elevation view taken substantially along the line 10—10 of FIG. 4.
Figure 11:
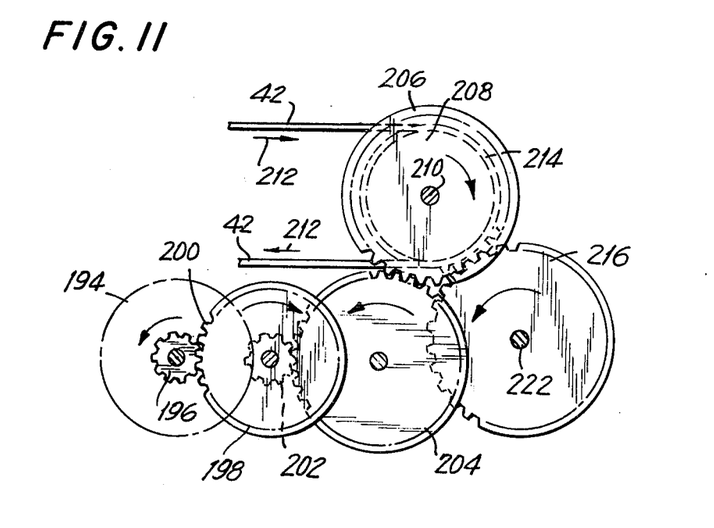
FIG. 11 is a sectional elevation view taken substantially along the line 11—11 of FIG. 4.

FIGS. 4 and 5, taken in conjunction with FIGS. 10 and 11, show the preferred structure, means and mode of driving the belts 38, 40 and 42. FIGS. 5 and 7 show the mode and means for adjusting the speed of the belts 38, 40 and 42, by means of a variable rheostat. By turning the ignition switch 60 to "ON" and by pressing the reset button 58 if necessary, electric current flows to an electric motor 194 (FIG. 4, 5 and 10), which drives the step-down gearing for the pulleys of the belts, via drive gear 196 which is mounted on the axle of the motor 194. A first step-down gearing 198 is provided to transfer power to the geared pulleys, which are characterized by a step-down gearing arrangement so that belt 42 moves at the fastest pre-determined speed, belt 40 moves at a somewhat slower speed than belt 42, and belt 38 moves at the slowest speed relative to the other two belts. The step-down gearing 198, as best shown in FIGS. 5 and 11, receives power from gearing 196 via an outer annular first gearing 200 meshed with gearing 196 (FIG. 11), and the resultant rotation of gearing 198 rotates inner gearing 202. It will be evident that this arrangement results in a diminished speed or rotation in terms of revolutions per minute, of gearing 202 relative to gearing 196, since one revolution of gearing 196 results in only a partial revolution of gearing 200 and hence only a partial revolution of gearing 202 also takes place. This concept is employed throughout the balance of the gear train so that successively slower speeds of rotation in terms of revolutions per minute (r.p.m.) are attained, and consequently successively slower pulley r.p.m. speeds and successively slower belt movements are attained.

Thus, referring to FIGS. 10 and 11, gearing 202 is meshed with and drives gearing 204 which in turn rotates and drives gearing 206, which as shown is of lesser diameter than gearing 204 so that further diminution of r.p.m. is attained. Gearing 206 rotates pulley 208 mounted axle 210 so that pulley 208 moves belt 42 as indicated by arrows 212, namely the upper horizontal reach of belt 42 moves toward the front of the game, i.e. towards the panel 22, and the lower horizontal reach of belt 42 moves rearwards.

A gearing 214 is coaxially mounted to the pulley 208 on the side of pulley 208 opposite to gearing 206, so that gearing 214 rotates together with pulley 208. Gearing 214 is of lesser diameter than gearing 206, and thus as power is transferred through gearings 204, 206 and 214 to a gearing 216 meshed with gearing 214, further step-down of r.p.m. is attained. The gearing 216 is coaxially mounted together with a smaller diameter gearing 218 on a common sleeve 220 which rotates about stationary shaft or axle 222. Thus further step-down of r.p.m. is attained as gearing 218 is meshed with and drives gearing 224, which rotates pulley 226 so that pulley 226 moves belt 40 in a manner similar to that in which pulley 208 moves belt 42 as described supra, but at a slower speed due to the step-down gearing feature of the invention. The balance of the gearing shown in FIG. 10 is similar in configuration and function to the gearings 206, 214, 216 and 218 described supra, and therefore the balance of the gearing will only be briefly described in the interest of brevity. The rotating pulley 226 rotates gearing 228 which is meshed with and drives gearing 230, which is mounted together with gearing 232 on sleeve 234 which in turn rotates about the fixed common shaft or axle 222. Gearing 232 is meshed with and drives gearing 236 on pulley 238 which drives belt 38. The step-down feature of the gearing 228, 230, 232, 236 results in a slower motion for pulley 238 and belt 38 than for the other pulleys and belts. The stationary shaft 222 is supported by U-shaped bracket 240, which bracket 240 also supports stationary axle 210 and thus supports the pulleys 208, 226 and 238 which rotate on axle 210.

The speed of the motor 194, and consequently the speeds of the pulleys and belts, is controlled by a variable rheostat 242 (FIGS. 5 and 7), which is of rectilinear configuration with a sliding member 243. The member 243, which adjusts electrical current to the motor 194 in a manner well known to those skilled in the art, is adjusted by linkage 244 which, as best shown in FIG. 5, is pivoted at both ends and pivotally attached at its lower end to an intermediate position on shaft member 246. The lower end 248 of shaft member 246 is pivotally mounted to the base of the enclosure, and a sector-shaped sign 250 bearing seriatim the symbols R,N,1,2 and 3 is attached to the shaft member 246. As shown in FIG. 4, one of the symbols on the sign 250, namely the numeral 1, indicating first and slowest forward gear, appears through the dashboard at 64. The top of the sign 250 with the symbol R may be seen in FIG. 7. The speed control via simulated gear shift knob or lever 62 basically simulates real vehicle gear shifting with three forward speeds (1, 2, 3), neutral (N), and reverse (R) speeds. Manipulation of knob 62, from which shaft member 246 depends through dashboard 24 via slot 252, concomitantly causes linkage 244 to displace slidable member 243 and to displace sign 250 in an arcuate path, so that gear settings via sign 250 and corresponding speeds of motor 194, and ultimately of toy vehicles 32, 34 and 36, are attained.

As electric current is passed via the variable rheostat 242 to electric motor 194, concomitantly the electric circuit provides for electric current to pass through a toy phonograph, not shown, so that the sound of moving vehicles emanates from loudspeaker 166. Electric power for the game is admitted via jack 254 which fits into rear receptacle 256 (FIG. 5).

Figure 12:
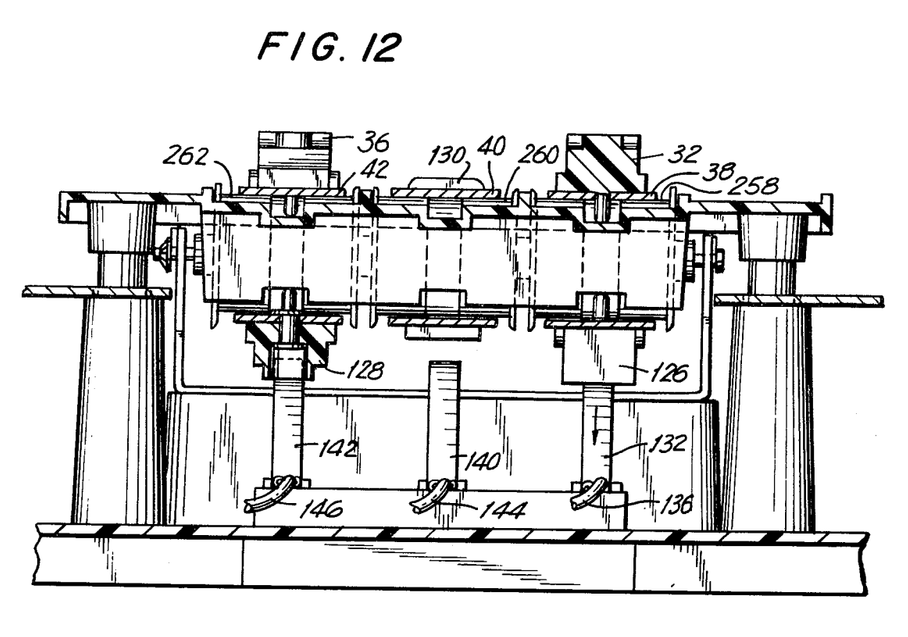
FIG. 12 is a sectional elevation view taken substantially along the line 12—12 of FIG. 5.
Figure 13:
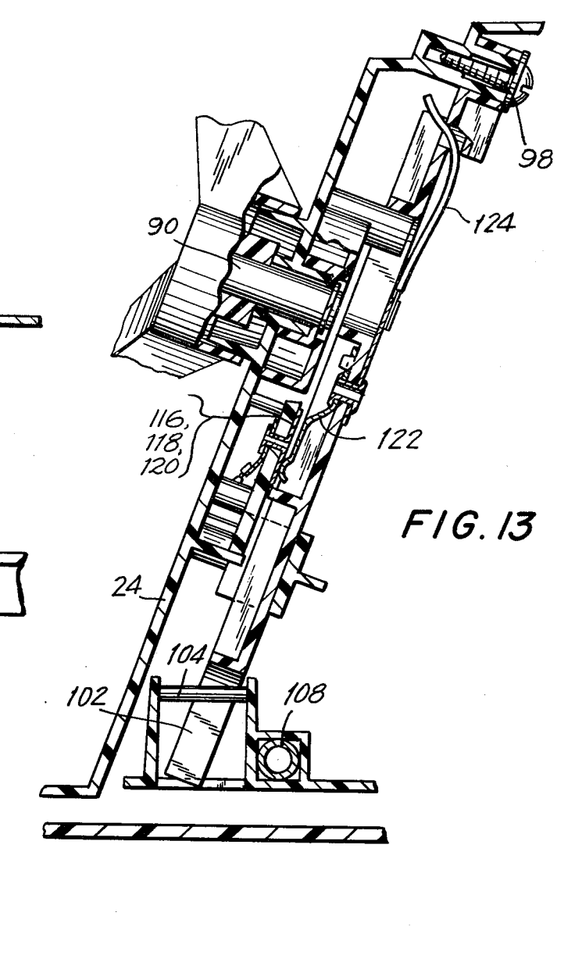
FIG. 13 is a sectional elevation view taken substantially along the line 13—13 of FIG. 7 but shifted to one of the phantom positions in line with a belt and contact.

FIG. 12 shows structural details of the mounting of the toy vehicles to the belts, as well as the rear belt mounting pulleys 258, 260 and 262 which do not perform any power function but which merely support the other ends of the respective belts 38, 40 and 42.

It thus will be seen that there is provided a simulated road racing game which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A simulated road racing game comprising an enclosure, means to provide light in said enclosure, a transparent panel, said transparent panel being both light transmissive and light reflective, said transparent panel being an inclined front part of said enclosure, at least one movable belt within said enclosure, said belt having a substantially horizontal reach, means within said enclosure to move said belt along said reach, at least one toy vehicle mounted on said belt, so that said one toy vehicle is visible through said inclined transparent panael, at least one other toy vehicle within and adjacent the front of said enclosure, said other toy vehicle being disposed in front of said inclined transparent panel so that the image of said other toy vehicle is reflected from said inclined transparent panel in juxtaposition with said one toy vehicle, means to manipulate said other toy vehicle so that the image of said other toy vehicle can be moved relative to said one toy vehicle, sensor means for sensing the instance of visual coincidence of said one toy vehicle with the image of said other toy vehicle, and means for imparting motion to said other toy vehicle such that said other toy vehicle appears to perform a somersault over said one toy vehicle in response to the sensing of said instance.

2. The road racing game of claim 1 in which the means to provide light in the enclosure is a plurality of slots in the top of the enclosure, together with a source of light above the top of the enclosure.

3. The road racing game of claim 2 in which the slots are juxtaposed in parallel.

4. The road racing game of claim 1 in which the transparent panel is inclined at an acute angle from the vertical.

5. The road racing game of claim 4 in which the acute angle is in the range of from about 15° to about 70°.

6. The road racing game of claim 5 in which the acute angle is about 35°.

7. The road racing game of claim 1 in which a plurality of movable belts is provided, together with means to move each of the movable belts, each of the movable belts having at least one toy vehicle mounted thereon and a substantially horizontal reach, the plurality of belts being juxtaposed in parallel within the enclosure.

8. The road racing game of claim 7 in which the number of movable belts is three.

9. The road racing game of claim 7 in which an end movable belt at one side of the plurality of belts moves at a predetermined speed and the remaining belts move at successively slower speeds.

10. The road racing game of claim 9 in which means are provided to concomitantly vary the speeds of all of the belts.

11. The road racing game of claim 10 in which an incremental increase in the speed of any one of the movable belts is greater than the incremental increase in the speed of the next slowest belt.

12. The road racing game of claim 7 in which the means to move each of the movable belts is a geared drive wheel on a pulley of the belt, together with an electric motor and means to pass electricity through said electric motor, said electric motor being geared to the drive wheel of at least one movable belt so that said electric motor drives said pulley.

13. The road racing game of claim 12 in which the pulleys of the movable belts are geared to each other seriatim so that all of the movable belts move in unison.

14. The road racing game of claim 13 in which the gearing of the pulleys is step down gearing so that an end movable belt at one side of the plurality of belts moves at a predetermined speed and the remaining belts move at successively slower speeds.

15. The road racing game of claim 14 in which the end movable belt is directly driven by the electric motor.

16. The road racing game of claim 12 in which the means to pass electricity through the electric motor is a variable means so that the speed of the electric motor may be varied.

17. The road racing game of claim 16 in which the variable means to pass electricity through the electric motor includes a variable rheostat which regulates the current passing through the electric motor, together with means to manipulate said variable rheostat.

18. The road racing game of claim 1 in which two spaced apart toy vehicles are mounted on the one belt.

19. The road racing game of claim 18 in which the two toy vehicles are equidistant from each other in both directions along the reach of the belt.

20. The road racing game of claim 1 in which the sensor means includes a lap counter which counts the number of laps of travel of the one toy vehicle prior to visual coincidence of the one toy vehicle with the image of the other toy vehicle.

21. The road racing game of claim 20 in which the lap counter is a digital lap counter.

22. The road racing game of claim 1 in which the sensor means includes at least one switch, an electric motor, and displaceable means mounting the other toy vehicle in position, said switch being closed when visual coincidence of the one toy vehicle with the image of the other toy vehicle takes place, so that an electric circuit is completed through said electric motor, said electric motor thereby displacing said displaceable mounting means so that the other toy vehicle is physically displaced.

23. The road racing game of claim 22 in which the switch is oriented in conjunction with means mounted to the movable belt so that said means closes the switch when the one toy vehicle is positioned by the belt at a visual coincidence with the image of the other toy vehicle.

24. The road racing game of claim 1 in which the means to manipulate the other toy vehicle is means to displace the other toy vehicle transversely relative to the movable belt.

25. The road racing game of claim 24 in which the means to manipulate the other toy vehicle includes a rotatable wheel coaxially mounted on a shaft, said rotatable wheel being capable of being manipulated so that said shaft is rotatable about its central longitudinal axis, a drive disc coaxially mounted on said shaft, said drive disc having a projecting annular first tab, said first tab being substantially perpendicular to the surface of said drive disc, together with a drive arm, said drive arm being pivoted at one end and having a slot, said first tab extending transversely into said slot, the other end of said drive arm being bifurcated and enclosing a second tab, said second tab being attached to slidable means mounting the other toy vehicle below the inclined transparent panel, so that manipulation of said rotatable wheel causes the means mounting the other toy vehicle to slide transversely relative to the movable belt.

26. The road racing game of claim 1 together with means to emit an audible sound, said means to emit an audible sound emitting a sound when said movable belt is in motion.

27. The road racing game of claim 26 in which the sound simulates the sound of vehicles in motion.

28. The road racing game of claim 1 in which the transparent panel is composed of glass.

29. The road racing game of claim 28 in which the glass panel is tinted.

30. The road racing game of claim 1 in which the transparent panel is composed of a sheet of plastic, said plastic being selected from the group consisting of cellulose acetate, polyvinyl chloride, polyethylene, polypropylene, acrylic resin, urea-formaldehyde resin, and nylon.

31. The road racing game of claim 30 in which the plastic panel is tinted.

32. The road racing game of claim 1 in which the one toy vehicle and the other toy vehicle are toy automobiles.

33. A simulated road racing game comprising an enclosure, means to provide light in said enclosure, a transparent panel, said transparent panel being both light transmissive and light reflective, said transparent panel being an inclined front part of said enclosure, at least one movable belt within said enclosure, said belt having a substantially horizontal reach, means within said enclosure to move said belt along said reach, at least one toy vehicle mounted on said belt, so that said one toy vehicle is visible through said inclined transparent panel, at least one other toy vehicle within and adjacent the front of said enclosure, said other toy vehicle being disposed below said inclined transparent panel so that the image of said other toy vehicle is reflected from said inclined transparent panel in juxtaposition with said one toy vehicle, means to manipulate said other toy vehicle so that the image of said other toy vehicle can be moved relative to said one toy vehicle, and sensor means for correlating the instances of visual correspondence of said one toy vehicle with the image of said other toy vehicle, when said movable belt is in motion and said other toy vehicle is manipulated, and for physically displacing the other toy vehicle in simulation of actual contact between the one toy vehicle and the other toy vehicle when visual coincidence of the one toy vehicle with the image of the other toy vehicle takes place, said sensor means including at least one switch, an electric motor, and displaceable means mounting the other toy vehicle in position, said switch being closed when visual coincidence of the one toy vehicle with the image of the other toy vehicle takes place, so that an electric circuit is completed through said electric motor, said electric motor thereby displacing said displaceable mounting means so that the other toy vehicle is physically displaced, said switch being oriented in conjunction with an additional toy vehicle so mounted to the movable belt as to be spaced apart from the one toy vehicle, said additional toy vehicle and the one toy vehicle being equidistant from each other in both directions along the reach of the belt so that said additional toy vehicle closes the switch when the one toy vehicle is positioned by the belt at a visual coincidence with the image of the other toy vehicle.

34. A simulated road racing game comprising an enclosure, means to provide light in said enclosure, a transparent panel, said transparent panel being both light transmissive and light reflective, said transparent panel being an inclined front part of said enclosure, at least one movable belt within said enclosure, said belt having a substantially horizontal reach, means within said enclosure to move said belt along said reach, at least one toy vehicle mounted on said belt, so that said one toy vehicle is visible through said inclined transparent panel, at least one other toy vehicle within and adjacent the front of said enclosure, said other toy vehicle being disposed below said inclined transparent panel so that the image of said other toy vehicle is reflected from said inclined transparent panel in juxtaposition with said one toy vehicle, means to manipulate said other toy vehicle so that the image of said other toy vehicle can be moved relative to said one toy vehicle, and sensor means for correlating the instances of visual correspondence of said one toy vehicle with the image of said other toy vehicle, when said movable belt is in motion and said other toy vehicle is manipulated, and for physically displacing the other toy vehicle is simulation of actual contact between the one toy vehicle and the other toy vehicle when visual coincidence of the one toy vehicle with the image of the other toy vehicle takes place, said sensor means including a first switch oriented in conjunction with actuating means mounted to the movable belt so that said first switch is closable by said actuating means, a second switch oriented in conjunction with displaceable means mounting the other toy vehicle in position, together with an electric motor, said first and second switches being closed when visual coincidence of the one toy vehicle with the image of the other toy vehicle takes place, so that when said first and second switches are closed, an electric circuit is completed through said electric motor, said electric motor thereby becoming actuated and displacing said displaceable mounting means so that the other toy vehicle is physically displaced.

35. The road racing game of claim 34 together with a third switch, the displaceable mounting means being rotatable and including a disc-shaped member geared to the electric motor and having a radial tab, said radial tab camming said third switch to an open position after a time interval during which the displaceable mounting means has rotated by 360° so that the electric motor circuit is broken and so that the other toy vehicle after circular displacement by 360° returns to its original position and orientation, the one toy vehicle having been moved by the movable belt during said time interval to a position in which the one toy vehicle is not visually coincident with the image of the other toy vehicle.

36. The road racing game of claim 35 in which the third switch when closed also completes an electrical circuit to an electric light within the enclosure, so that said electric light becomes lit during the time interval.

37. The road racing game of claim 36 in which the electric light when intermittently lit illuminates a recognizable identity symbol within the enclosure, so that the image of the recognizable identity symbol is visible through or by reflection from the inclined transparent panel.

38. The road racing game of claim 37 in which the recognizable identity symbol is a sign having a word thereon, said word corresponding to the simulation of actual physical contact between the one toy vehicle and the other toy vehicle.

39. The road racing game of claim 38 in which the word is wipeout.

40. The road racing game of claim 35 in which the third switch when closed also completes an electrical circuit to means to emit an audible sound.

41. The road racing game of claim 40 in which the sound simulates the sound of actual physical contact between vehicles.

42. The road racing game of claim 35 together with a digital lap counter which counts the number of laps of travel of the one toy vehicle prior to visual coincidence of the one toy vehicle with the image of the other toy vehicle, the third switch when closed also interrupting a circuit so that said digital lap counter ceases counting the completion of a lap of travel of the one toy vehicle.

* * * * *